Figure 8:
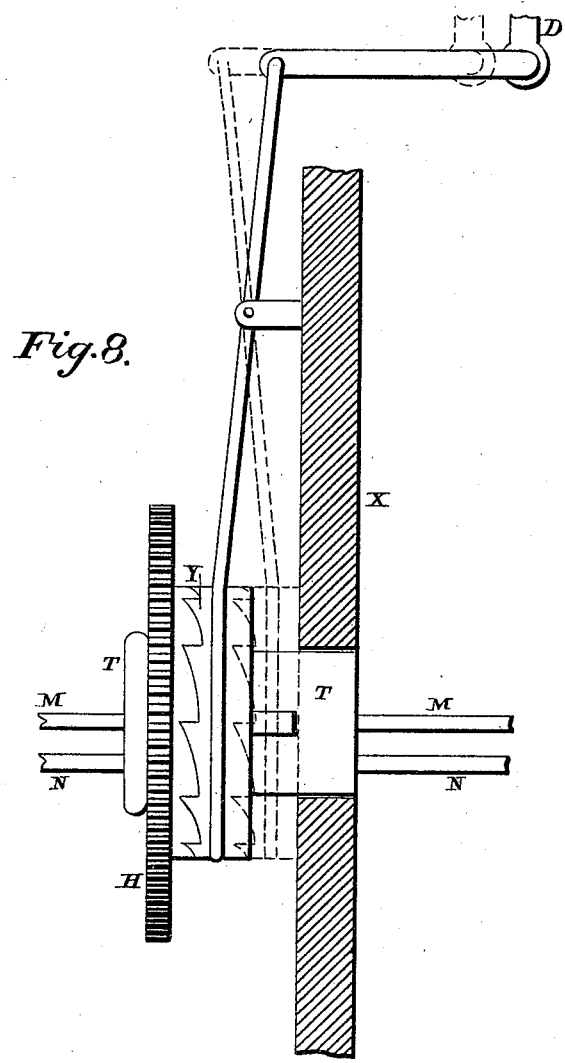

(No Model.)　　　　　　　　　　　　　　　　2 Sheets—Sheet 1.
A. STANSEL.
SEEDING MACHINE.
No. 438,501.　　　　　　　　　　Patented Oct. 14, 1890.
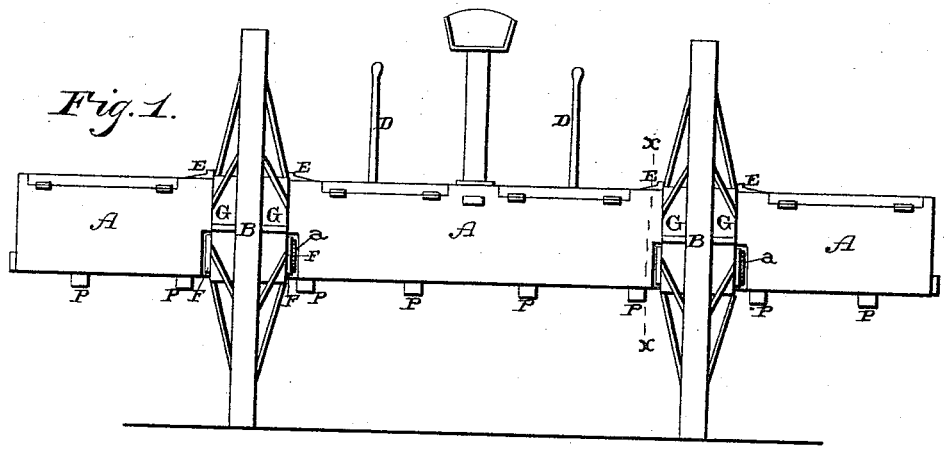
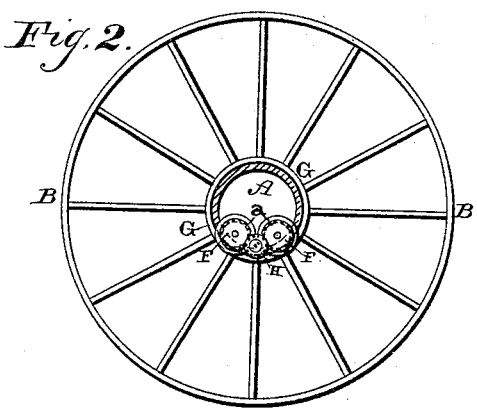 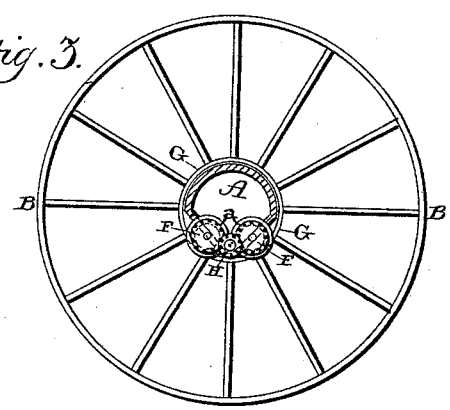
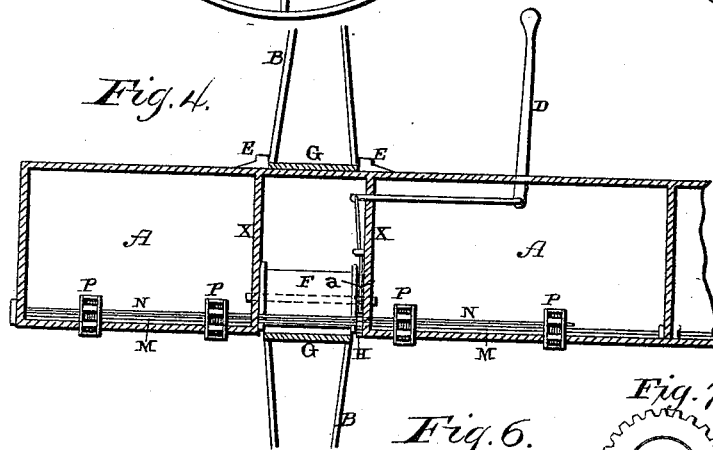 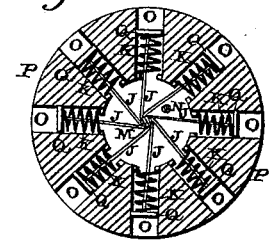
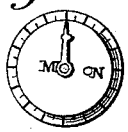 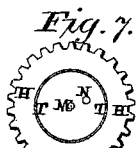
Witnesses:
E. P. Elees
A. Stevens Pattison
Inventor:
A. Stansel,
per
F. A. Lehmann, atty (No Model.)

A. STANSEL.
SEEDING MACHINE.

No. 438,501. Patented Oct. 14, 1890.

Witnesses:
E. T. Ellis
B. Brockett

Inventor:
Alonzo Stansel,
per F. A. Lehmann,
atty

UNITED STATES PATENT OFFICE.

ALONZO STANSEL, OF YORKVILLE, ILLINOIS.

SEEDING-MACHINE.

SPECIFICATION forming part of Letters Patent No. 438,501, dated October 14, 1890.

Application filed February 8, 1890. Serial No. 339,676. (No model.)

*To all whom it may concern:*

Be it known that I, ALONZO STANSEL, of Yorkville, in the county of Kendall and State of Illinois, have invented certain new and useful Improvements in Seeding-Machines; and I do hereby declare the following to be a full, clear, and exact description of the invention, such as will enable others skilled in the art to which it pertains to make and use it, reference being had to the accompanying drawings, which form part of this specification.

My invention relates to improvements in seeding-machines; and it consists in the combination of a stationary seeding-box, wheels provided with large circular hubs through which the seeding-box passes, operating friction-rollers placed inside of the hubs, smaller friction-rollers which are operated by the larger ones, and shafts which both revolve the seed-cups and regulate the amount of seed that shall be sown, as will be more fully described hereinafter.

The object of my invention is to place the seed-box inside of the hubs of the driving-wheels and to cause the rotation of the driving-wheels to operate the seeding mechanism placed in the boxes.

Figure 1 is a rear elevation of a planter which embodies my invention. Figs. 2 and 3 are vertical sections taken on the dotted line $x\ x$ of Fig. 1, showing a slight difference in the shape of the seed-boxes. Fig. 4 is a longitudinal section showing the seeding mechanism. Fig. 5 is an enlarged vertical section of one of the seed-cups. Fig. 6 is an end view of the regulator placed upon one end of the seed-box. Fig. 7 is a detail view of the roller H. Fig. 8 is an enlarged detached view of the clutch.

A represents the feed-box, which will be of any desired length and shape that may be preferred, and B are the driving-wheels, which have their hubs G made in the form of large rings, which pass entirely around the seed-boxes, as shown. This seed-box may be made round only at its top and V-shaped at its bottom; or it may be made circular throughout, as may be preferred.

Placed either wholly inside of the seed-box or partly inside and partly out and bearing directly against the inner side of the hubs of the two wheels B are friction-rollers F, which are journaled in suitable partitions X, formed inside of the seed-box, and which by frictional contact with the interior of the hubs G are caused to revolve when the wheels B are revolved by the forward motion of the seeder. These rollers F, as here shown, have cogs $a$ at one end only, but may be provided with cogs at one or both of their ends or may be provided with cogs at one end and smooth flanges at the other, and they have their teeth mesh with the small roller H, as shown in Figs. 2 and 3, for the purpose of operating it. The flanges upon the ends of these rollers F catch over opposite edges of the hubs G, so as to retain them in place, and the hubs are further retained in position upon the seed-box A by means of the stops or guides E, which are secured to the top of the seed-box, as shown in Fig. 1, and which stops or guides also catch against opposite edges of the hubs. Friction-rollers may be employed instead of solid stops, as here shown, if so desired. These stops or guides and flanges on rollers F hold the wheels in any desired position upon the seeder and prevent any lateral or uneven movement of the wheels in relation to the seed-box A.

The small roller H is provided with teeth in one or both of its ends, so as to receive a positive motion through the rollers F, and passing through this smaller roller or wheel H is a thimble T, in which are the two shafts M N. The shaft M passes loosely through the feed-cups P and thimble T without operating them; but the cups exert a sufficient frictional contact upon this shaft M to cause it to revolve with them. This shaft extends from the outer end of the box to its center, and is journaled by passing through thimbles in the outer end of the box and the partitions placed therein. To the outer end of this shaft M is secured a pointer, which revolves with the shaft. A second shaft N passes through the thimble in the small roller H, the partitions, and the seed-cups P, slightly to one side of their centers, and this shaft N being rigidly secured to the thimbles and cups P causes them to revolve for the purpose of dropping the seed. A dial plate is secured to outer end of shaft N and revolves with it. These seed-cups are constructed as shown in Fig. 5, and each one has a number of separate compartments O, in which a sliding bottom Q is placed, and which is connected to a wire J. Inside of this sliding bottom Q are placed suitable spiral springs K, which have their outer ends to bear against the sliding bottoms Q and their inner ends supported by projections formed for that purpose.

The shaft M is revolved by the pointer, and either wraps or unwraps the cords J therefrom, according to the direction in which it is turned. If the shaft is caused to revolve in one direction, the wires J are wrapped around it, and as these wires are wrapped around it the bottoms Q are drawn backward into the cups or receptacles O, thereby compressing the springs and enabling a larger quantity of seed to be taken into the receptacles and discharged therefrom. If the shaft is revolved in the opposite direction, the wires are unwound and the springs K force the bottoms Q outward, so as to decrease the holding capacity of the cups or receptacles. The shaft N necessarily revolves around the shaft M and acts like a crank to cause the seed-cups P to revolve.

Each pair of rollers F and smaller roller H operates the two shafts M N, placed in thimbles T, and the seed-cups which are attached thereto without any interference from the other.

Upon the thimble T will be placed a suitable clutch Y, which is operated by the lever D and the rods and levers connected thereto, whereby the thimble T, through which passes the shaft N, may be thrown out of gear with the thimble H whenever so desired, and thus stop the feeding mechanism.

Having thus described my invention, I claim—

1. The combination of the wheels provided with tubular hubs, the seed-box which extends through and is operated inside of the hubs, the stops or guides applied to the box for holding the wheels in position, the friction-rollers F, provided with flanges for holding wheels and cogs on the flanges, the small roller H, also provided with cogs, and which is operated by the rollers F, the two shafts M N, operated by the roller H, the seed-cups, and the pointer secured to the outer end of the shaft M, substantially as shown.

2. The combination of the wheels provided with tubular hubs, the seed-box placed inside of the hubs, the friction-rollers F, the two shafts M N, the thimbles T, the seed-cups P, the wires J, the movable bottoms Q, and the springs K, substantially as described.

3. In a seed-planter, the combination of the wheels provided with tubular hubs, the seed-box extending through and supported by the hubs, the friction-rollers F, provided with flanges on which are cogs so as to mesh together, the smaller roller H, also provided with cogs and operated by the rollers F, the two shafts M N, the thimbles T, holding shafts, and the seed-boxes P, one of the shafts being made to pass loosely through the boxes and thimbles for the purpose of regulating the quantity of seed that shall be taken up, and the other shaft being made to revolve the seed-cups, substantially as specified.

In testimony whereof I affix my signature in presence of two witnesses.

ALONZO STANSEL.

Witnesses:
 DOW SHIBLEY,
 E. C. BRIDGENS.